E. E. HENEGAN.
Corn-Planters.

No. 143,450.

Patented Oct. 7, 1873.

Witnesses.
J. Mason Goszler
Wm. A. Poor

Inventor.
Edward E. Henegan
per R. S. & A. P. Lacey
attorneys.

UNITED STATES PATENT OFFICE.

EDWARD E. HENEGAN, OF DOWNSVILLE, WISCONSIN.

IMPROVEMENT IN CORN-PLANTERS.

Specification forming part of Letters Patent No. 143,450, dated October 7, 1873; application filed June 17, 1873.

*To all whom it may concern:*

Be it known that I, EDWARD E. HENEGAN, of Downsville, in the county of Dunn and State of Wisconsin, have invented certain new and useful Improvements in Corn-Planters; and I do hereby declare the following to be a full, clear, and exact description of the invention, such as will enable others skilled in the art to which it pertains to make and use it, reference being had to the accompanying drawings, which form part of this specification.

The object of my invention is to provide a machine which will accurately and regularly plant corn, and at the same time check-mark the land; and it consists in employing a corn-receiving hopper (or series of hoppers) mounted upon a frame, carried by an axle, supported upon driving-wheels.

The under side of the hopper is provided with a semicircular guide, in which a semicircular corn-receiver and regulator oscillates. This receiver is supported and carried by an oscillating platform or frame, and is so arranged that it will alternately open a passage and receive from the hopper a quantity of corn, which it will discharge into the mouth of a planting-tube. This planting-tube is hinged, at its upper end, to the oscillating platform, by which it is alternately raised and lowered, and, at its lower end, is provided with arms or extensions, which, on the downward motion of the planting-tube, will check-mark the earth, and indicate the place where the corn is planted.

The oscillating platform is operated by means of a projection or projections formed on or affixed to one of the driving-wheels.

Markers are attached to the axle at different points, in positions so as, while sowing one row or series of rows, to indicate the position of the next.

My invention will be more fully understood by reference to the accompanying drawings.

Figure 1:
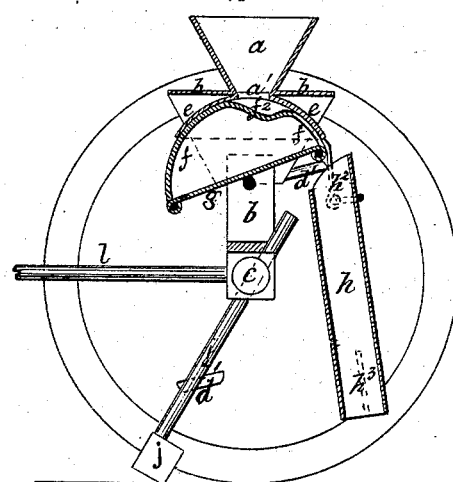
Figure 2:
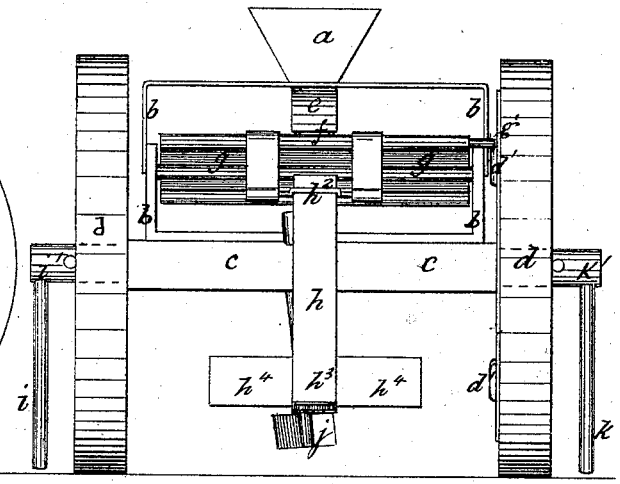
Figure 3:
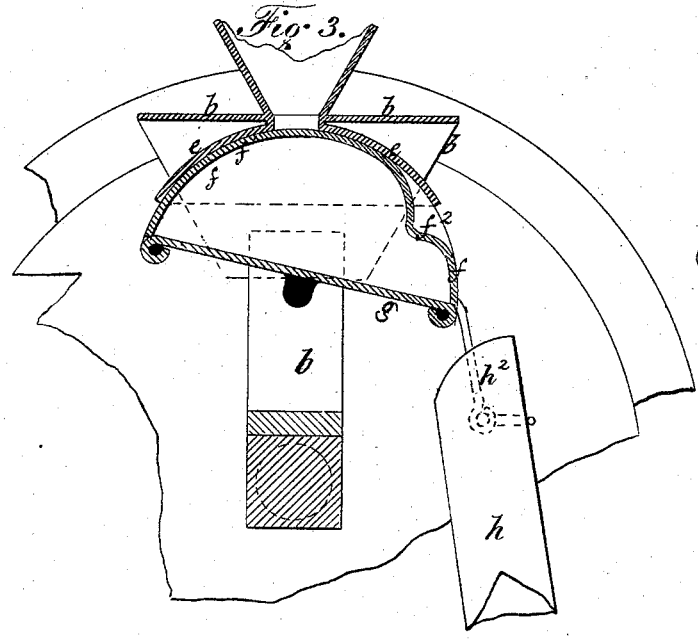
Figure 4:
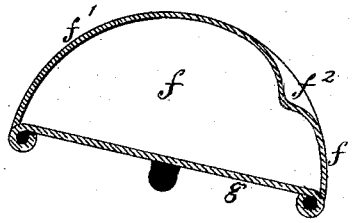

Figure 1 is a vertical section, Fig. 2 an end view, and Figs. 3 and 4 are sectional views, enlarged, of my invention.

$a$ is a corn-receiving hopper, mounted on a frame, $b$, carried by an axle, $c$, which is supported upon the driving-wheels $d$. The under side of the hopper $a$ is provided with a semicircular guide, $e$, in which a semicircular corn-receiver and regulator, $f$, oscillates. This receiver and regulator $f$ is supported and carried by an oscillating platform or frame, $g$, and is so arranged that, in its oscillations, it will alternately, by reason of the form of its outer surface $f^1$, open a passage $a'$ from the hopper $a$, receive a quantity of corn into the indentation $f^2$, and then discharge such corn into the mouth of the planting-tube $h$, which, at its upper end $h^2$, is hinged to the oscillating platform $g$, by which it is alternately raised and lowered, and, at its lower end $h^3$, it is provided with arms or extensions $h^4$, which, in the downward motion of the planting-tube $h$, check-mark the earth and indicate the position of the corn planted. The oscillating platform $g$ is operated by means of projections $d'$ formed on or affixed to the wheel $d$. $j$ is a tooth or share attached to the axle for opening a furrow in which to plant the corn. $i$ and $k$ are markers attached to the axle $c$ for the purpose, while planting one row, of marking the place for the next. $l$ is the pole or tongue to which the horses are attached.

In the operation of the machine, the corn to be planted is put in the hopper $a$, and, as the apparatus is drawn along, the receiver or regulator $f$ is caused to oscillate by means of the projections $d'$ on the wheel $d$ coming against and raising the end $g'$ of the platform or frame $g$, and, at each oscillation, a given quantity of seed is received by the indentation $f^2$, and discharged into the planting-tube $h$, by which it is conveyed to the furrow opened by the tooth or share $j$, and, as the planting-tube falls as the corn to be planted is fed therein, a check-mark is formed by the arms or extensions $h^4$.

In use, I do not employ the markers $i$ $k$ at the same time, only when I would use the machine for the purpose of check-marking alone. In practice I use the marker $i$, and shift it from $i$ to $k$, and vice versa, at each 'bout.

It will be readily seen that a series of hoppers, $a$, and parts connected therewith, may be arranged on one axle, so that the machine could be constructed to plant two or more rows at one time.

Having described my invention, what I claim, and desire to secure by Letters Patent, is—

The oscillating receiver $f$, platform $g$, and planting-tube $h$, in combination with the hopper $a$, frame $b$, and guide $e$, substantially as shown, and for the purpose specified.

In testimony that I claim the foregoing I have hereunto set my hand and seal this 11th day of April, 1873.

EDWARD E. HENEGAN. [L. S.]

Witnesses:
  J. B. HOLDERBY,
  J. MASON GOSZLER.